(12) United States Patent
Joppi et al.

(10) Patent No.: US 10,314,143 B2
(45) Date of Patent: Jun. 4, 2019

(54) METHOD AND SYSTEM FOR IMPROVING LIGHTING CONTROL AND METHOD AND SYSTEM FOR CONTROLLING A LIGHTING DEVICE

(71) Applicant: ZUMTOBEL LIGHTING GMBH, Dornbirn (AT)

(72) Inventors: Rene Joppi, Dornbirn (AT); Gregor Mayr, Dornbirn (AT)

(73) Assignee: ZUMTOBEL LIGHTING GMBH, Dornbirn (AT)

( * ) Notice: Subject to any disclaimer, the term of this patent is extended or adjusted under 35 U.S.C. 154(b) by 0 days.

(21) Appl. No.: 15/568,604

(22) PCT Filed: Apr. 29, 2016

(86) PCT No.: PCT/EP2016/059637
§ 371 (c)(1),
(2) Date: Oct. 23, 2017

(87) PCT Pub. No.: WO2016/174217
PCT Pub. Date: Nov. 3, 2016

(65) Prior Publication Data
US 2018/0084623 A1    Mar. 22, 2018

(30) Foreign Application Priority Data

Apr. 30, 2015  (DE) .................. 10 2015 208 002

(51) Int. Cl.
*H05B 37/02*    (2006.01)
(52) U.S. Cl.
CPC ..... *H05B 37/0227* (2013.01); *H05B 37/0272* (2013.01); *H05B 37/0281* (2013.01); *H05B 37/0218* (2013.01); *Y02B 20/42* (2013.01)

(58) Field of Classification Search
CPC ............ H05B 37/0245; H05B 37/0254; H05B 37/0281; H05B 37/0272; H05B 37/0227
(Continued)

(56) References Cited

U.S. PATENT DOCUMENTS

| 6,348,867 B1 | 2/2002 | Myllymaki |
| 9,679,482 B2 | 6/2017 | Werner et al. |

(Continued)

FOREIGN PATENT DOCUMENTS

| DE | 69921633 | 1/2005 |
| DE | 20 2011 108475 | 3/2012 |

(Continued)

OTHER PUBLICATIONS

German search report in pending German Application 10 2015 208 002.1 dated Feb. 19, 2016.
(Continued)

*Primary Examiner* — Douglas W Owens
*Assistant Examiner* — Syed M Kaiser
(74) *Attorney, Agent, or Firm* — Andrus Intellectual Property Law

(57) ABSTRACT

The invention relates to a method and a system for improving lighting control In said method, lighting information relating to the light emitted by a lighting device (3) and bodily data of a person present in the lighting area or in a predefined area of the lighting device (3) are detected using a means (1) for detecting bodily data, the bodily data and lighting information that have been detected at a specific, simultaneous point in time are assigned to one another and transmitted to a data collection system (2). The invention also relates to a method and a system for controlling a lighting device (3), in which method bodily data of a person present in the lighting area or in a predefined area of the lighting device (3) are detected using a means (1) for (Continued)

detecting bodily data, the lighting device (3) being controlled in accordance with the detected bodily data.

22 Claims, 3 Drawing Sheets

(58) Field of Classification Search
USPC ............... 315/158, 152, 294, 307, 291, 131; 398/118, 130
See application file for complete search history.

(56) References Cited

U.S. PATENT DOCUMENTS

| | | | | |
|---|---|---|---|---|
| 2009/0003832 | A1* | 1/2009 | Pederson | H04B 10/1143 398/135 |
| 2012/0262069 | A1* | 10/2012 | Reed | H05B 37/0218 315/130 |
| 2014/0052220 | A1* | 2/2014 | Pedersen | A61N 5/0618 607/88 |
| 2014/0086590 | A1* | 3/2014 | Ganick | G06Q 30/02 398/118 |
| 2014/0186048 | A1* | 7/2014 | Oshima | H04B 10/541 398/118 |
| 2014/0186049 | A1* | 7/2014 | Oshima | H04B 10/1143 398/118 |
| 2014/0186050 | A1* | 7/2014 | Oshima | H04B 10/1143 398/118 |
| 2014/0191682 | A1* | 7/2014 | Pederson | H04B 10/1143 315/294 |
| 2014/0232903 | A1* | 8/2014 | Oshima | H04N 5/3532 348/229.1 |
| 2014/0265920 | A1* | 9/2014 | Pederson | H05B 33/0842 315/294 |
| 2016/0321891 | A1* | 11/2016 | Zheng | H04L 12/2825 |

FOREIGN PATENT DOCUMENTS

| | | |
|---|---|---|
| DE | 10 2012 206691 | 10/2013 |
| WO | 9956262 | 11/1994 |
| WO | 2010079388 | 7/2010 |
| WO | 2013111134 | 8/2013 |

OTHER PUBLICATIONS

PCT search report in priority PCT Application PCT/EP2016/059637 dated Sep. 16, 2016.

* cited by examiner

METHOD AND SYSTEM FOR IMPROVING LIGHTING CONTROL AND METHOD AND SYSTEM FOR CONTROLLING A LIGHTING DEVICE

CROSS REFERENCE TO RELATED APPLICATIONS

The present application is the U.S. national stage application of International Application PCT/EP2016/059637, filed Apr. 29, 2016, which international application was published on Nov. 3, 2016 as International Publication WO 2016/174217 A1. The International Application claims priority to German Patent Application 10 2015 208 002.1, filed Apr. 30, 2015.

FIELD OF THE INVENTION

The present invention relates to a method or a system for improving lighting control, in which lighting information regarding the light emitted by a lighting device and physical data of a person located in the lighting range or in a predefined range of the lighting device are recorded. Furthermore, the present invention relates to a method or a system for controlling a lighting device in which the physical data of a person located in the lighting range or in a predefined range of the lighting device are recorded.

BACKGROUND OF THE INVENTION

In many different fields of lighting technology (e.g. industry, offices, schools/universities, and hospitals), light management, or lighting control, has become increasingly important. It is increasingly frequent that lighting is controlled, or switched on and off, depending on various factors. Thus, in order to save energy, a daylight control, or a control based on presence notification or absence notification is used. A daylight control can also serve to maintain a more or less uniform light level in a building or a room over the course of the day.

Another field in which light management, or lighting control, has become increasingly important is assessing the effect of the light on the well-being and productivity of humans located in the lighted region of such a lighting. It is already known that the type of light emission has an effect on human biorhythms, wherein it is generally assumed e.g., that light having a higher blue content has a stimulating effect, while in contrast, lower color temperatures are more calming. Various advantages can be obtained in different applications by influencing humans through the type of light emission. It is thus conceivable: e.g., in industry, for the light to have a stimulating effect, resulting in fewer absences and a higher productivity by the employees; in offices, a greater level of physical comfort resulting in higher productivity can be obtained; in schools/universities, a stimulating effect resulting in an improved learning behavior can be obtained; and in hospitals, this can be used in supporting the healing process, and to produce a calming effect.

Numerous studies have already been conducted regarding the effects of light on human well-being and productivity, the validity of which is questionable insofar as only a relatively small number of test subjects have been studied, because such studies are relatively complicated. is the studies are complicated because, among other things, a sampling of people having different demographic backgrounds are required to come into a laboratory, where their physiological reactions are measured. Because of this complexity, such studies are carried out with a limited number of people (a maximum of a few hundred people). Furthermore, physiological reactions such as stress, pulse rate, etc. are affected by a number of factors, e.g. the current physical state of being. Due to the low number of participants, it has hardly been possible in the studies so far to form clusters according to age, sex, etc.

The validity of such studies is, accordingly, fairly low, and only very little useful information regarding optimal lighting control has been obtained from the studies.

Moreover, it should also be noted that dimming and color temperature sequences are permanently stored in present day systems, and cannot be adapted, e.g. to site-specific conditions. The system also receives no feedback as to whether such sequences have a positive effect on the people in question.

On the whole, the previous studies have provided hardly any reasonably usable information on how lighting control has a positive effect on the majority of people, in terms of well-being and productivity.

SUMMARY OF THE INVENTION

The object of the present invention is thus to create a possibility for getting positive effects on the well-being and productivity of people through the effects of light.

The object is achieved through a method for improving lighting control as described below, a system for improving lighting control as described below, a method for controlling a lighting device as described below, and a system for controlling a lighting device as described below.

In accordance with the invention, a method and a system for improving lighting control is provided, in which the lighting information regarding the light emitted from a lighting device, and physical data of a person located in the lighting range, or in a predefined range of the lighting device, are recorded. The physical data and lighting information recorded at the same specific time are assigned to one another and transmitted to a data collection system. The system has at least one lighting device, at least one means for recording physical data, and one data collection system for this.

Advantageously, it is provided that at numerous, different points in time, physical data and lighting information are recorded and assigned to one another respectively, and transmitted to the data collection system, wherein the lighting device can emit a different light at each of the different points in time.

Preferably, the physical data of numerous people can be recorded with numerous means for recording physical data, wherein each person is assigned at least one means for recording physical data, and the lighting information of the lighting device is assigned to the respective physical data of a person. Alternatively, there may be numerous lighting devices, wherein the physical data of the person are assigned to the lighting information of the lighting device in the lighting range, or predefined range, in which the person is located. It is likewise a possibility that physical data and lighting information are recorded for different people and numerous lighting devices, and these are each assigned to one another, and transmitted to the data collection system, wherein the physical data of a person is assigned to the lighting information of the lighting apparatus, in the range, or predefined range, of which the person is located.

Moreover, it can also be provided that further information on the person, e.g. age or sex, is transmitted to the data collection system.

Advantageously, the physical data and lighting information assigned to one another, or respectively, the physical data and lighting information assigned to one another and the further information on the person, are evaluated such that information regarding the effect of the light of the lighting device on the well-being or productivity of the person is obtained. The data collection system can also be configured to evaluate the physical data and lighting information assigned to one another.

The lighting device can preferably be controlled depending on the information regarding the effect of the lighting and/or the recorded physical data, wherein the data collection system can be configured to control the lighting device.

Furthermore, a method and a system for controlling a lighting device is provided in accordance with the invention, in which physical data of a person located in the lighting range, or in a predefined range of the lighting device, are recorded and the lighting device is then controlled depending on the recorded physical data. The system has a lighting device and a means for recording physical data for this.

With both the method and the system for improving lighting control, as well as with the method and the system for controlling a lighting device, the predefined range can be a sub-region of the lighting range of the lighting device, in particular a workstation.

Likewise, the position of the person can be determined with the method and the system for improving lighting control as well as with the method and system for controlling a lighting device, wherein the determination of the position of the person takes place, in particular, with respect to whether the person is located within the lighting range, or predefined range of the lighting device. The system for improving lighting control, or the system for controlling a lighting device can also have means for determining the position of the person, wherein these means can comprise a GPS, RFID, NFC or Bluetooth means.

Advantageously, it is then also provided that the physical data, or the physical data and the lighting information, are then only recorded when the person is located inside the lighting range, or the predefined range, of the lighting device.

The method and the system for improving lighting control preferably provide that the data collection system is disposed centrally in a building or building complex, e.g. in a center for a large lighting system, or in the internet, e.g. in a Cloud, or on a server of the manufacturer. Alternatively, the data collection system can also be disposed locally, e.g. in a smartphone.

It is preferably provided with the method and system for controlling a lighting system that the system has a central control device, which is disposed centrally in a building or building complex, e.g. in a center for a large lighting system, or in internet, e.g. in a Cloud or on a server of the manufacturer. The system can be configured to transmit the physical data recorded by a means for recording physical data to a central control device, and the central control device can be configured to control the lighting device depending on the recorded physical data.

Preferably, the means for recording physical data in the system for improving lighting control, or in the system for controlling a lighting device, has a sensor, transmitting and/or receiving unit, for recording the physical data, wherein the sensor, transmitting and/or receiving unit is disposed in particular in an activity tracker, e.g. a bracelet or wristwatch, or in a smartwatch. In addition, a receiving and transmitting unit can also be provided, wherein the receiving and transmitting unit is disposed in particular in a smartphone. Furthermore, the sensor, transmitting and/or receiving unit can be configured to transmit the recorded physical data to the receiving and transmitting unit The receiving and transmitting unit is preferably configured to control the lighting device.

In the system for improving lighting control, the lighting device can be configured to transmit the lighting information to the sensor, transmitting and/or receiving unit, or the receiving and transmitting unit, and the sensor, transmitting and/or receiving unit, or the receiving and transmitting unit can be configured to assign the lighting information to the physical data and to transmit the physical data and lighting information assigned to one another to the data collection system, or to the data collection system via the receiving and transmitting unit.

Alternatively, the lighting device can also be configured to transmit the lighting information to the data collection system, the sensor, transmitting and/or receiving unit, or the receiving and transmitting unit can be configured to transmit the physical data to the data collection system, and the data collection system can be configured to assign the transmitted physical data to the transmitted lighting information.

The means for determining the position can be disposed in or together with the sensor, transmitting and/or receiving unit, or the receiving and transmitting unit, in the system for improving lighting control, or in the system for controlling a lighting device.

With the method according to the invention or the system according to the invention for improving lighting control it is possible to continuously obtain information during normal operation of a lighting device regarding the effect of the light on the well-being and productivity of humans or people, wherein data can be collected for a very large number of people through the proposed approach.

As a result, in comparison with previous studies in which, e.g. a maximum of a few hundred people participated, a much larger number, e.g. numerous thousands of, or even a hundred thousand, people can contribute to the collecting of information regarding the effect of light on the well-being and productivity of humans. As a result, due to the large number of people, certain individual disruptive factors can be reduced or eliminated, e.g. very exceptional momentary physical states of being of an individual or the possibly entirely different reaction of one person in comparison with many others to a specific type of light.

It should be noted here, that the physical data can be, e.g., the pulse, blood pressure and perspiration, as well as movements of the user, determined via an MEMS gyroscope or acceleration sensors. The physical data serve in particular for detecting the response of the human to an emitted light, or emitted lighting of the lighting device. I.e., by assigning physical data to corresponding lighting information, it is possible to determine how a person reacts to a specific lighting situation, or how this lighting situation affects the person with respect to well-being and productivity.

It should also be noted that data or information regarding the effects of the lighting, which have been determined and evaluated by a method or system for improving lighting control, can also be used in lighting devices, or such systems in which no recording of lighting information and physical data takes place. This can occur, for example, in that a manufacturer determines and evaluates such data or information regarding the effects of the lighting through a method or system for improving lighting control and uses this in lighting devices or such systems without recording lighting information and physical data.

It is possible to control a lighting device with the method according to the invention, or the system according to the invention, for controlling a lighting system, in accordance with recorded physical data, i.e. as a function of the well-being or productivity of a person. It is possible, e.g., for guidelines to be stored in the lighting device for controlling the lighting, which are derived from the information regarding the effects of the light, which have been recorded and evaluated by a method or system for improving lighting control. This means that, e.g., with certain determined physical data, the lighting is controlled in a specific manner, such as is indicated by the guidelines. This can also depend on the field of application in which the lighting device is disposed.

It would likewise also be conceivable for the lighting device to be controlled by the physical data, without guidelines being stored in the lighting device, which have been determined by a method or system for improving lighting control. In this case, it would then be conceivable that the lighting device makes a change in the lighting, and can determine, based on the recorded physical data, the extent that this change in lighting has an effect on the well-being and productivity of the person. As a result, a continuous adjustment is then possible.

BRIEF DESCRIPTION OF THE DRAWINGS

The invention shall be explained in greater detail below based on exemplary embodiments and the attached drawings.

DETAILED DESCRIPTION

As explained above, light management has become increasingly important in various fields of lighting technology. One field that has become increasingly relevant is the effect of light on human well-being and productivity. Previous available studies are not very useful, because the number of test subjects has been limited due to a relatively high level of complexity.

The dimming and color temperature sequences resulting from such studies, which have been stored on or in a lighting device in order to control it accordingly, are rigid, and cannot be adjusted, e.g. to the site-specific conditions or to meet specific requirements of a user.

The present invention, provides means for recording physical data of a person that is located in the lighting range, or in a predefined range of a lighting device. At the same time, lighting information regarding the emitted light is recorded by the lighting device. The physical data and lighting information recorded at the same specific time are then assigned to one another and transmitted to a data collection system. As a result, there is a clear correlation between lighting information and the physical data recorded at the same time, by means of which it is possible to be able to evaluate this collected data, in particular with regard to how the light affects the human well-being and productivity.

The lighting information reproduces a specific lighting situation generated by the lighting device, wherein this can concern, e.g., dimming values or color temperature values.

Figure 1:
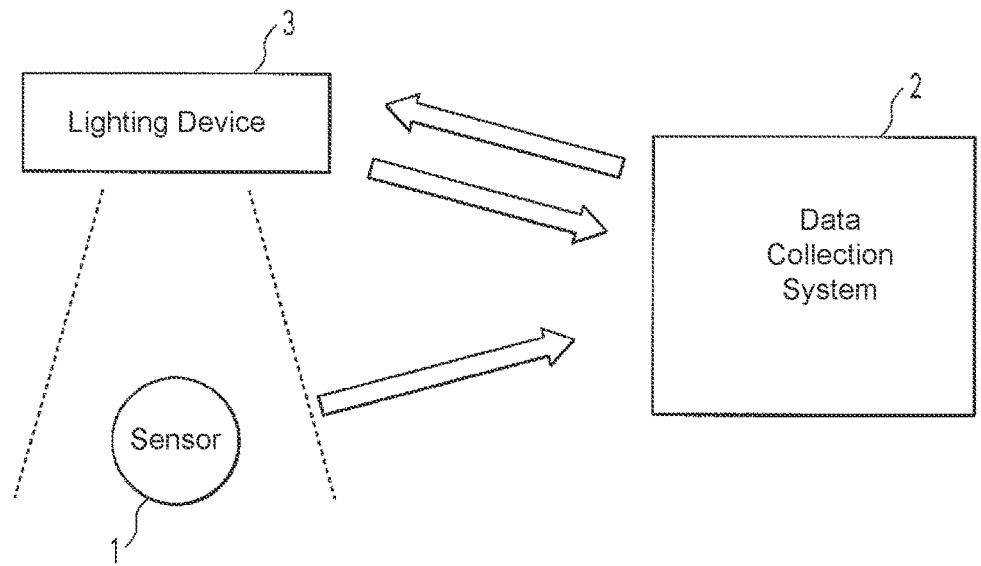
FIG. 1 shows a schematic illustration of a system for improving lighting control.

A system for improving lighting control is shown schematically in FIG. 1, wherein means 1 for recording physical data is provided, which transmits the recorded physical data of a person to a data collection system 2. The data collection system 2 also receives lighting information for a lighting device 3, wherein the physical data and the lighting information are recorded at the same specific point in time. The data collection system 2 then assigns the physical data to the corresponding lighting information.

In order to then determine a correlation between a specific lighting situation, defined by the lighting information, and the physical data, or vital data, the data collection system 2 evaluates the physical data and lighting information assigned to one another, such that it is determined how the lighting situation affects the well-being and productivity of the person in question.

The person from which the physical data was recorded, is located inside the lighting range or a predefined range of the lighting device 3, wherein the predefined range of the lighting device 3 can be a sub-region of the lighting range. By way of example, it may be provided that a lighting device, or lamp, is assigned to a specific workstation, and the workstation comprises a specific, predefined area.

It should be noted that recording physical data of a person only makes sense when the person is inside the lighting range or the predefined range, because otherwise, the light emitted by the lighting device 3 has no effect on the well-being or productivity of the person. For this, it may be provided, for example, that by using appropriate means for determining the position of a person, the position of the person is then determined with regard to whether the person is located inside the lighting range, or the predefined range, e.g. a workstation. The physical data and relevant lighting information are only recorded and assigned to one another if the person is located inside the lighting range, or the predefined range, of the lighting device.

The means for determining the position can be, e.g., a GPS, RFID, NFC, or Bluetooth means. Other means that enable the determination of the position of a person are also conceivable. It would thus be conceivable that by using, for example, a camera disposed in a room or a space, the area in a space or room in which the person is located is determined, by means of which it is then possible to determine whether the person is in the lighting range or a predefined range of the lighting device 3.

The means for determining the position of the person are also useful when numerous lighting devices 3 are provided in a building or building complex, each of which has a lighting range or a predefined range. In this case, it may be provided that, if the person moves back and forth between the different lighting devices 3, the lighting information of the respective lighting device 3 is linked to the physical data of the person as he enters the lighting range or predefined range of the respective lighting device 3. The determination of which lighting range or predefined range in which the person is currently located can then be carried out by the means for determining the position of the person.

Alternatively, it could also be provided that the physical data of the person is only assigned to a previously established, specific lighting device 3, or its lighting information, e.g. the workstation of the person, if the person in question has a permanent workstation inside a building. In this case, assignment takes place only when the person is at the workstation, but not when the person leaves, e.g. for lunch at midday.

Moreover, it may also be that one lighting device 3 provides light for numerous people in which case the lighting information of the lighting device 3 is assigned the physical data of each person.

In order to obtain the largest possible data collection, it is provided in particular that both the lighting information for numerous lighting devices 3, as well as the physical data of numerous people, are available, wherein the physical data of a person is assigned to the lighting information of the lighting device 3 in the lighting range or predefined range in which the person is located at the point in time when the lighting information and physical data are recorded.

Moreover, it is also provided that the physical data and lighting information are recorded in second or minute intervals, for example, and that this takes place over a longer period of time. There is the possibility that over the course of the lighting, it is modified in a targeted manner, in order to be able to determine whether these changes in the lighting affect the physical data, and if so, how. As a result, it is possible to obtain knowledge through the systematic changing of the lighting situation regarding how the lighting must be modified in order to improve the well-being of the person, or his or her physical data.

As a rule, it may be provided that, prior to starting the recording of physical data and lighting information, dimming and color temperature sequences are already stored in a lighting device 3 as starting sequences, which have been obtained, for example, through previous, known studies. These dimming and color temperature sequences help at the beginning with the control of the lighting device 3, wherein through recording and assigning physical data and lighting information, and the corresponding evaluation, new information can be obtained accordingly, regarding the effects of light on the well-being or productivity of a person, by means of which the initially stored dimming and color temperature sequences can then be further improved, or recalculated, or adjusted. This means that the values for controlling the lighting device 3 stored in the lighting device can be adjusted to the information obtained through the evaluation of the corresponding data, wherein this adjustment can take place both prior to as well as during a direct controlling of the lighting device 3.

The starting sequences specified above can then also be stored in the data collection system 2, and are then synchronized to the lighting device 3. There is also the possibility of a user adjusting the sequences to his preferences at the start, via an appropriate app. Optimized lighting sequences could then also be created in the data collection system 2, wherein these comprise, e.g., improved dimming and color temperature sequences, or corresponding lighting intensity sequences. The optimized lighting sequences can then be transmitted to the lighting device 3, wherein this can also take place via a smartphone, which is connected directly to the lighting device 3.

Independently of whether an adjustment of the values stored in the lighting device 3 is carried out, and also independently of whether any specific values are stored in the lighting device 3, it can be provided with the control of the lighting device 3, that the lighting device 3 is controlled in accordance with the recorded physical data and the information obtained through the evaluation of the collected data.

Thus, the recorded physical data can be used directly for control, wherein there is still the possibility of assigning the recorded physical data and lighting information to one another at the same time, and to transmit it to the data collection system 2 for evaluation.

The data collection (recording the physical data and lighting information, and assigning thereof to one another), the evaluation of the collected data regarding the well-being or productivity of people, and potentially, the adjustment of values aligned therewith, and the controlling of the lighting device, can be carried out both inside a building or building complex, as well as for very different buildings, or on a global level. As a result, it is then possible to obtain a significantly more comprehensive dataset in comparison with previous known studies, in which the risk of individual statistical deviations that reduce the reliability of the results is significantly reduced. In addition, the individual physical states of individuals no longer has a significant effect on the results of the overall data.

The manufacturer then has the possibility of obtaining relatively good values regarding the effects of light on the well-being and productivity of people, based on a relatively comprehensive data collection, independently of individuals, by means of which there is also the possibility for a manufacturer to better adjust the lighting devices. It is thus also possible for a lighting device to already be supplied with appropriate data, e.g., when it is manufactured, such that the lighting device has improved values, e.g. for dimming and color temperature sequences, and accordingly, a better control as well, independently of whether the users have means for recording physical data. This means that the improved data can also be used in previous lighting devices, independently of whether physical data from users thereof are sent to a data collection system.

It is likewise possible that even though appropriate means for recording physical data of people are available, no data is collected, i.e. lighting information is not assigned any physical data, and such associated data is not transmitted to a data collection system for evaluation. In this case, it is merely provided that a control of the lighting device takes place depending on the recorded physical data. Such a system is shown by way of example in FIG. 2, in which a means 1 for recording physical data and a lighting device 3 are provided.

It is likewise possible that even though appropriate means for recording physical data of people are available, no data is collected, i.e. lighting information is not assigned any physical data, and such associated data is not transmitted to a data collection system for evaluation. In this case, it is merely provided that a control of the lighting device takes place depending on the recorded physical data. Such a system is shown by way of example in FIG. 2, in which a means 1 for recording physical data and a lighting device 3 are provided.

Figure 2:
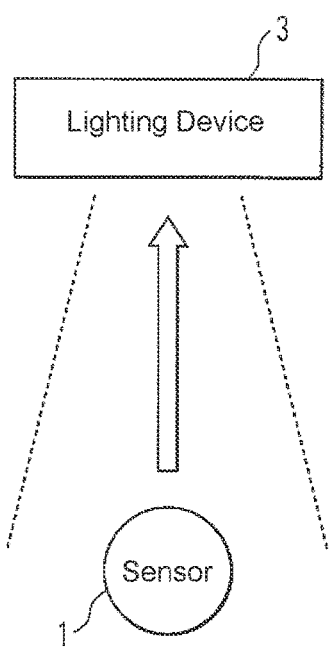
FIG. 2 shows a schematic illustration of a system for controlling a lighting device.

It should be noted regarding the means 1 for recording physical data shown in both FIG. 1 and FIG. 2, that this can include a sensor, transmitting and/or receiving unit, which is configured to determine or record corresponding physical data, and subsequently send it to another device. The sensor, transmitting and/or receiving unit can be an activity tracker, for example, which has enjoyed increasing use in daily life. Likewise, the sensor, transmitting and/or receiving unit can also be disposed in an activity tracker. Activity trackers of this type can take the form of a wristwatch or bracelet, wherein they continually measure a variety of physical data.

Figure 4:
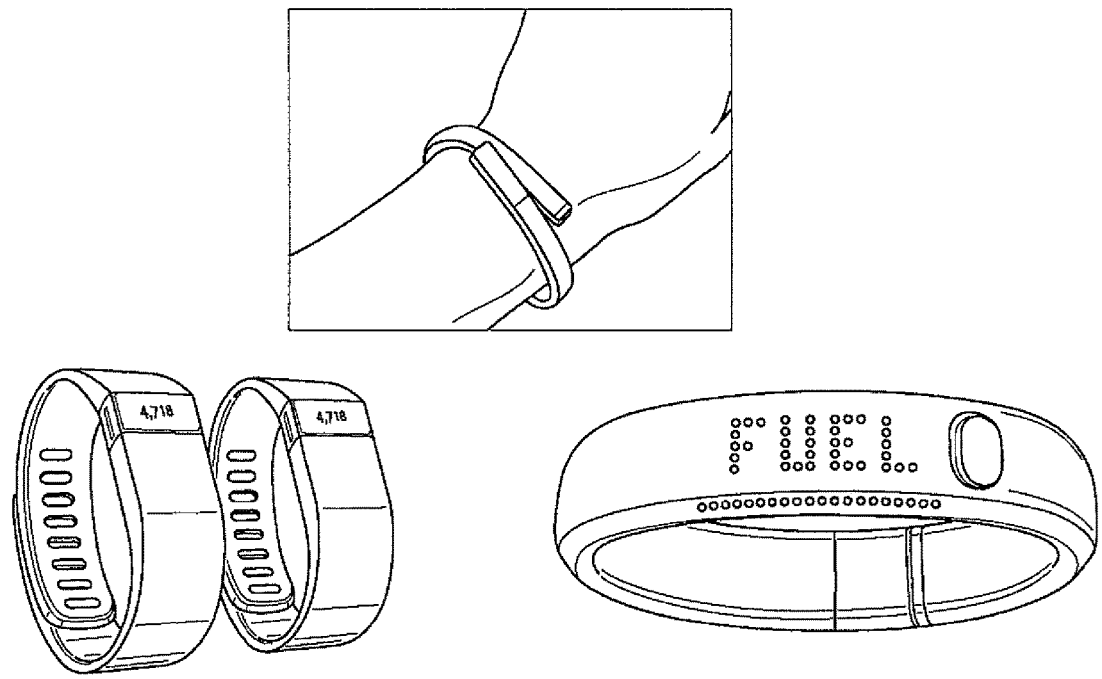
FIG. 4 shows an illustration of various activity trackers for recording physical data.

Various activity trackers are shown in FIG. 4. These activity trackers are currently used for the most part in sports, although other fields of application are also possible. It is possible to measure or determine, for example, the stress level or the alertness of a person through the measurement of the corresponding physical data, by means of which it can be determined how the light affects humans. Examples of such activity trackers are, among others, the products Fitbit, Jawbone Up, or the Fuelband by Nike. It can likewise be a simple, manufacturer-specific, inexpensively produced bracelet, in order to be able to equip a large number of people therewith.

A smartwatch can also be used as a sensor, transmitting and/or receiving unit, as an alternative to the previous classic activity trackers, which likewise enables the measurement of corresponding physical data. The sensor, transmitting and/or receiving unit can likewise be disposed in a smartwatch.

Furthermore, other means from wearable technology that can record corresponding physical data, are conceivable. As a rule, any conceivable sensor, transmitting and/or receiving unit that enables, on one hand, the recording of physical data, and on the other hand, enables the processing or forwarding of these recorded physical data, is suitable as a means for recording physical data.

Figure 5:
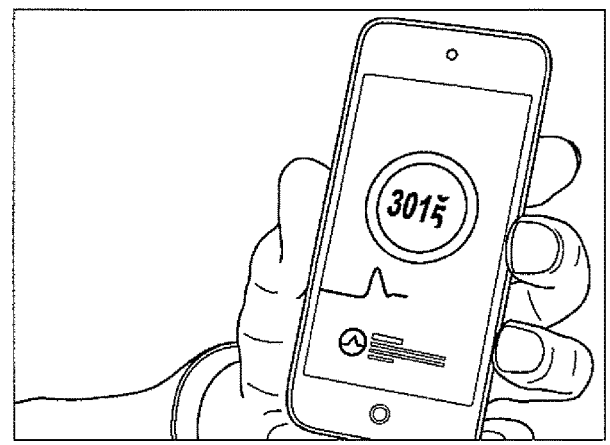
FIG. 5 shows a smartphone, which receives physical data.

Depending on which sensor, transmitting and/or receiving unit is used, it may also be useful to provide a further receiving and transmitting unit, to which the sensor, transmitting and/or receiving unit can transmit the physical data, as a means for recording physical data. By way of example, the activity trackers specified above are currently usually coupled with a smartphone, i.e. the recorded physical data are transmitted by the activity tracker to the smartphone, or, respectively, the smartphone is connected to the activity tracker. Accordingly, the smartphone can then be regarded as a receiving and transmitting unit. A smartphone that receives such physical data is shown, by way of example, in FIG. 5.

It is also conceivable for an app to be installed on a smartphone, through which a user is able to carry out specific adjustments, which define a desired state for the person, i.e., whether the person would prefer to relax, etc. for example. It is likewise conceivable to modify or adjust corresponding dimming and color temperature sequences.

With the present invention, it can be provided that the physical data recorded by the sensor, transmitting and receiving unit are transmitted by the sensor, transmitting and receiving unit to the receiving and transmitting unit, and the receiving and transmitting unit then forwards the received physical data to the data collection system. It may also be provided, for example, that the receiving and transmitting unit also receives the lighting information of the lighting device, and an assignment of the lighting information and the corresponding physical data to one another already takes place in the receiving and transmitting unit, and then the associated physical data and lighting information are subsequently transmitted to the data collection system.

Alternatively, it would also be conceivable that the receiving and transmitting unit receives the lighting information as well, in addition to the recorded physical data, but does not assign the physical data and the lighting information to one another, and instead transmits the physical data and the lighting information to the data collection system, and the data collection system first carries out the assignment of the physical data and the lighting information to one another. It would also be possible for the data collection system to receive the lighting information from the lighting device directly, and carries out a corresponding assignment to the physical data received from the receiving and transmitting unit.

Moreover, it would also be possible for the receiving and transmitting unit to receive the lighting information from the lighting device, and then send it to the sensor, transmitting and/or receiving unit, and for the sensor, transmitting and/or receiving unit to carry out an assignment of the physical data and the lighting information to one another, and then transmit these assigned physical data and lighting information directly to the data collection system, or to the data collection system via the receiving and transmitting unit.

It is also possible for the sensor, transmitting and/or receiving unit, e.g. an appropriately further developed smartwatch, to be configured such that the sensor, transmitting and/or receiving unit is in direction connection with the data collection system, and accordingly, also transmits the physical data directly to the data collection system. It is possible thereby for the data collection system to receive the lighting information of the lighting device, and carry out a corresponding assignment to the physical data.

It is likewise also conceivable for the sensor, transmitting and/or receiving unit to receive the lighting information from the lighting device, carry out an assignment to the physical data, and transmit the physical data and lighting information assigned to one another to the data collection system, or for the sensor, transmitting and/or receiving unit to receive the lighting information from the lighting device, but not to carry out an assignment to the physical data, instead, transmitting the physical data and lighting information to the data collection system, wherein the assignment then takes place in the data collection system.

Moreover, it would also be conceivable for the data collection system to receive the lighting information, and then transmit it to the sensor, transmitting and/or receiving unit, and for the sensor, transmitting and/or receiving unit to carry out an assignment to the physical data, and subsequently, transmit the physical data and lighting information assigned to one another to the data collection system.

It should be noted thereby, that with the possibilities described above, it can also be provided that a receiving and transmitting unit is nevertheless disposed between the sensor, transmitting and/or receiving unit and the data collection system, which in this case serves merely for the data transfer between the sensor, transmitting and/or receiving unit and the data collection system.

It should also be noted on the whole, that both the sensor, transmitting and/or receiving unit, or the receiving and transmitting unit, as well as the data collection system, can be configured to receive the lighting information of the lighting device, and are configured to either assign the physical data and lighting information to one another, or transmit it to the unit or apparatus that carries out the assignment. Depending on which unit or apparatus the assignment takes place in, the physical data are transmitted from the sensor, transmitting and/or receiving unit to the receiving and transmitting unit, and to the data collection system, or to the data collection system via the receiving and transmitting unit. Lastly, the assigned physical data and lighting information are transmitted to the data collection system, if the assignment does not take place in the data collection system.

The data collection system can then be disposed in a center for a lighting system of a larger building or building complex, wherein the center has, for example, a corresponding server or suchlike. It is likewise conceivable for the respective devices of the data collection system to be disposed at respective locations in the internet via corresponding internet connections, i.e. in a Cloud, wherein the corresponding computing and storage capacities are accessible in the Cloud, or somewhere else in the internet, e.g. on corresponding server farms, by means of which there is the possibility of collecting very large quantities of data, from both a very large number of users, as well as from a very large number of lighting devices, at entirely different locations in the world, by means of which a study is obtained with a very large quantity of data, which is significantly more meaningful than previous studies.

Such a Cloud or server farm can also be a server or server farm of a manufacturer of lighting devices, by means of which it can collect corresponding data, possibly also anonymously, at a central location, and obtain, as a result, a relatively large study regarding the effects of the lighting on humans. This introduces the possibility of already improving the future lighting devices during the production phase.

If the data collection system is disposed centrally in a building complex or a building, or anywhere in the internet, it is possible for a smartphone, for example to communicate, as the receiving and transmitting unit, with the data collection system via an appropriate connection, e.g. via a WLAN in a building, or via the telephone network and the internet. It would likewise be possible for the sensor, transmitting and/or receiving unit to communicate directly with the data collection system, without being redirected through a smartphone or a receiving and transmitting unit, wherein the corresponding sensor, transmitting and/or receiving unit then has communication means comparable to a smartphone. This is conceivable, e.g. in a smartwatch, which has been further developed accordingly, configured such that it can be operated self-sufficiently by a smartphone. It would also be possible, however, for a sensor, transmitting and/or receiving unit to communicate with the data collection system via a router, which then serves as a receiving and transmitting unit.

Figure 3:
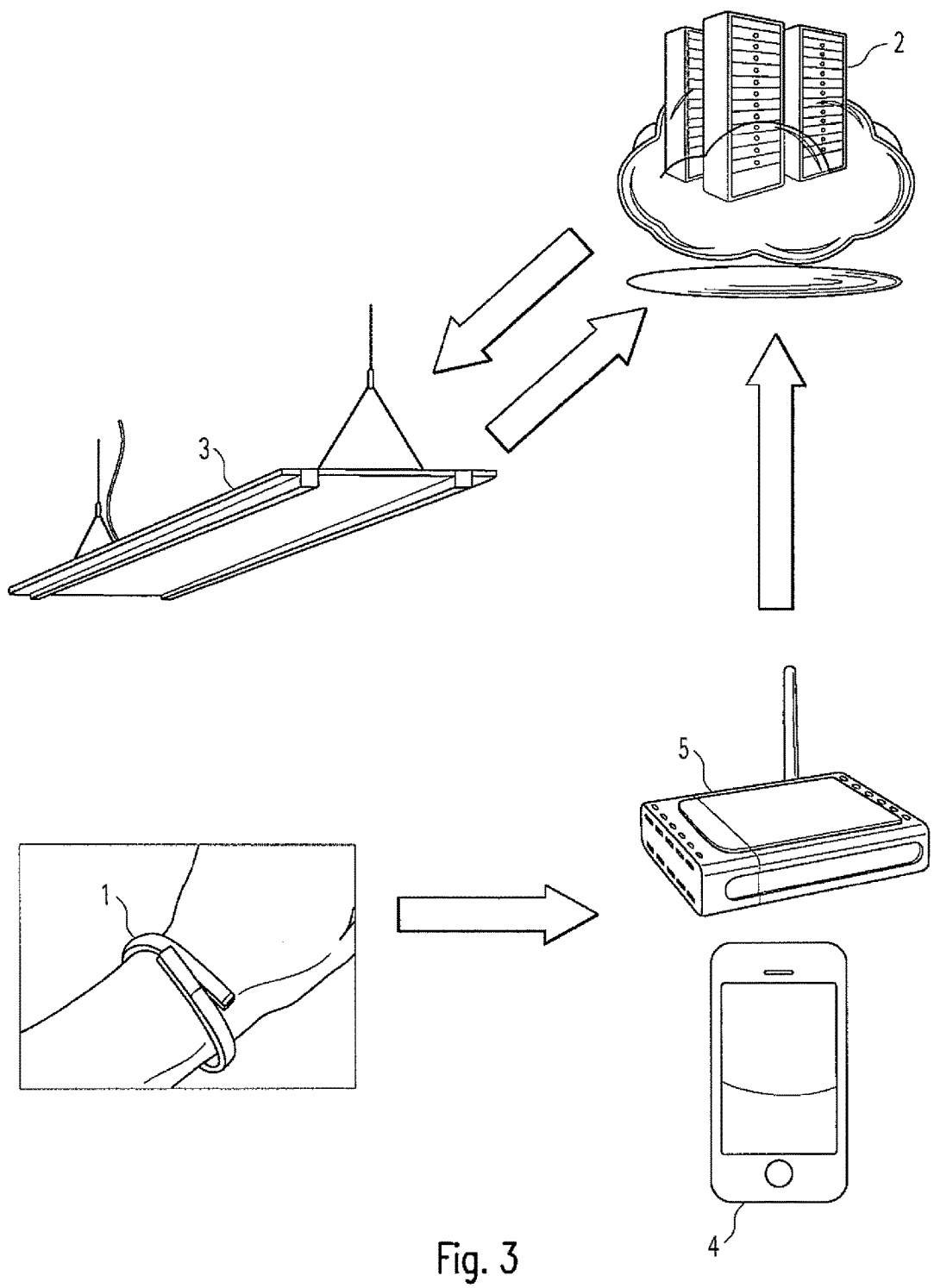
FIG. 3 shows a schematic illustration of a system for improving lighting control.

A corresponding system for improving lighting control is shown, by way of example, in FIG. 3, in which an activity tracker communicates, as a sensor, transmitting and/or receiving unit 1, with either a smartphone, as a receiving and transmitting unit 4, or a router 5, and the smartphone 4 or the router 5 then communicates with the data collection system 2. The lighting device 3 is in direct contact with the data collection system 2.

The physical data can be, e.g., the blood pressure, pulse, perspiration, body temperature, or movement speed and movement frequency of a person. With these parameters, it is possible to determine the extent a specific lighting situation affects the physical state or well-being of a person, and their productivity.

For reasons of data protection, it is preferably provided with the invention that the transmitted data are anonymous. It can, however, be provided on a voluntary basis, that in order to improve the data evaluation, these data are supplemented by personal information, e.g. age, sex, etc. Furthermore, it is also possible to provide information regarding a type of user, e.g. production employees, or office employees, or patients, as well as information regarding a business in which one works. The input of such data can take place, e.g. with an appropriate app.

Through the use of the appropriate means for recording physical data, employees in production or offices are then used in order to measure or record corresponding physical data, wherein corresponding lighting information is also determined or recorded at the same time. As a result, it is possible to reach a conclusion regarding the effects of the lighting, wherein this is obtained, in particular or advantageously, in that the lighting sequences are modified, and the physiological reactions of the humans to these changes are measured.

Using this information transmitted to the data collection system, there is the possibility for creating an improved lighting sequence based on a large quantity of corresponding data.

Through the voluntary provision of demographic data, it is also possible to reach statistical conclusions through the combination of demographic data, guidelines for applications, and the physical data, as to which sequences result in the best physiological effects for specific groups of users.

An advantage with this is approach is that it is no longer the case that a few series of measurements are conducted in a laboratory under unnatural conditions, based on a small sample of users, such that reliable results cannot be obtained. Instead, it is now possible to use a very large number of participants, theoretically even from all of the data collected worldwide, and to obtain reliable results therefrom. The physical data can be measured every few seconds, for example, as explained above, resulting in a relatively large quantity of data, which can be statistically evaluated. This also results in the advantage, based on the large quantity of data, that statistically disruptive variables, e.g. momentary physical state of being, which may have strongly corrupted the results in previous studies due to the small sampling, can be filtered out through the large quantity of data. This is also important, in particular, with factors such as well-being and stress levels.

In both the method or system for improving lighting control, as well as the method or system for controlling a lighting device, there is also the possibility of providing the user with the opportunity, e.g. via an app in a smartphone, of assigning the sensor, transmitting and/or receiving unit, e.g. the activity tracker, to a specific lighting device. There is likewise the possibility for a user to determine which lighting devices are relevant for him, i.e. which lighting devices he intends to control. This also applies to the recording and assigning of lighting information and physical data, because the user can determine which lighting devices are relevant therewith, and accordingly, for which lighting devices such an assignment is to take place.

As stated above, there is the further possibility of also using appropriately optimized lighting sequences in lighting devices for which users have no corresponding means for recording physical data. Nevertheless, with the optimized lighting sequences, these lighting devices also exhibit an improved light emission.

A few fields of application shall be discussed briefly below, in which an optimization of the control of a lighting device is accompanied with advantages.

By way of example, in an industrial setting, all of the employees in the production environment can be equipped with corresponding activity trackers. These measure the pulse, body temperature, movement speeds, and movement frequencies. When production steps require a very high level of concentration, for example, it is then possible to evaluate the stress or exhaustion of a person by means of these parameters. For this, the parameters are evaluated empirically, and conclusions are drawn accordingly therefrom. Thus, by way of example, a reduction in movement speed could indicate exhaustion, or an increased pulse rate and higher body temperature could indicate a stressful situation.

When the activity tracker measures these parameters, the lighting system, or lighting device, can react to the detected situation, and have a stimulating or calming effect on the respective people by modifying the lighting intensity or the color temperature. As a result, the people can concentrate more effectively, and error frequency is reduced. At the same time, possible health problems can be discovered through the measurement of these data, thus providing better care for the employees.

By recording the data for all of the people, it is also possible to empirically determine which light results in the best effects, and which lighting situation is preferred by the people. These findings can then be used in all projects.

In offices spaces as well, all of the employees in the production environment can also be equipped with such activity trackers. These in turn measure the pulse, body temperature, movement speeds, and movement frequencies and directions. The principles of stimulating and calming light can also be used here.

By recording the movement speeds/frequencies and directions, a pattern can also be created, in order to detect and eliminate potential unnecessary pathways. This could result in determining that relocating the printer, for example, results in significant time savings.

In the field of retail outlets, customers should be stimulated to make purchases. There are current studies on this, e.g. limbic lighting, which propose optimal dimming and color temperature values for different clusters of customers. It is conceivable here to measure physical data of customers possessing such activity trackers while shopping, in order to further optimize the light. This would require motivating customers to participate, possibly via an incentive or rebate system. Moreover, with clever positioning, the light can also be controlled accordingly, such that customers are motivated to purchase other articles, and to remain in the shop longer In hospitals, optimal light can, e.g. contribute to patient regeneration. Physical data can also be measured here, in order to further optimize lighting sequences. This is accompanied by the challenge of filtering physical data relating to illnesses out of the measurement data. The large quantity of data that can be collected can be very useful for this.

It can be derived from these application examples that the goal regarding the optimization of the lighting control can differ, and can also vary depending on the field of use or field of application.

What is claimed is:

1. A method for controlling a lighting device, the method comprising the steps of:
   providing a lighting device having a starting sequence in a facility and setting a predefined range of the lighting device;
   placing a wearable sensor and wireless transmitter on a person in the facility;
   detecting the location of the person within the facility;
   detecting a physical state of the person using the wearable sensor when the person is located within the predefined range of the lighting device, the physical state of the person comprising at least one of the person's pulse and blood pressure, and wirelessly transmitting the detected physical state;
   at numerous specific times, recording said detected physical state in a data collection system;
   at the same specific times, recording the starting sequence from said lighting device in the data collection system;
   assigning the physical state and the starting sequence that are recorded at the same specific times to one another when the person is determined to be located within the predefined range of the lighting device and storing the physical state and starting sequence in the data collection system;
   creating an optimized lighting sequence from the assigned physical state and starting sequence in the data collection system.

2. The method according to claim 1, wherein the starting sequence comprises at least one of dimming values and color temperature values at different points in time.

3. The method according to claim 1, further comprising the step of controlling the lighting device to emit light with different characteristics comprising at least one of dimming values and color temperature values at different points in time.

4. The method according to claim 1 wherein numerous lighting devices are provided, and the physical state of the person are assigned to the lighting data of the lighting device in the predefined range of which the person is located.

5. The method according to claim 1 wherein the physical state of numerous people is recorded, wherein the starting sequence of the lighting device is assigned in each case to the physical state of each person within the predefined range of the lighting device.

6. The method according to claim 1 wherein the physical state and the starting sequence of various people and numerous lighting devices are recorded and assigned in each case to one another, and transmitted to the data collection system, wherein the physical state of each person is assigned to the lighting data of the respective lighting device in the predefined range of which the respective person is located.

7. The method according to claim 1 wherein further information regarding the person, comprising age or sex, is transmitted to the data collection system and assigned to the physical state and the starting sequence for the specific times.

8. The method according to claim 1 wherein the predefined range is a sub-region of a full lighting range of the lighting device.

9. The method according to claim 1 wherein the position of the person relative to the predefined range is determined using a camera disposed in the facility.

10. The method according to claim 1, wherein the position of the person relative to the predefined range is determined by using identification software on a computer at a workstation.

11. The method according to claim 1, wherein the data collection system is configured to evaluate the physical state and the starting sequence assigned to one another.

12. The method according to claim 1, further comprising the step of controlling the lighting device according to the optimized lighting sequence.

13. The method according to claim 1, wherein the wearable sensor and wireless transmitting unit is disposed in an activity tracker.

14. The method according to claim 1, wherein the transmitting unit is disposed in a smartphone and the wearable sensor is coupled to the smartphone.

15. The method according to claim 14, wherein the wearable sensor is configured to transmit the recorded physical state to the smartphone.

16. The method according to claim 14 wherein transmitting unit is configured to also control the lighting device.

17. The method according to claim 1, wherein the means for determining the position are disposed in or together with the wearable sensor, transmitting and/or receiving unit, or the receiving and transmitting unit.

18. The method according to claim 1, wherein the wearable sensor and transmitter are part of a wearable device that also includes at least one wearable location device comprising GPS, RFID, NFC or Bluetooth circuitry and the location of the person is determined using the wearable location device.

19. The method according to claim 1, wherein the physical state further includes at least one of perspiration, body temperature, movement speed, and movement frequency.

20. The method according to claim 1, wherein the physical state is anonymous.

21. The method according to claim 1, wherein the physical state is supplemented with data regarding the type of user comprising at least one of production employee, office employee, patient, and line of business in which the user is employed.

22. The method according to claim 1, further comprising the step of controlling a different lighting device according to the optimized lighting sequence.

* * * * *